United States Patent
Kang et al.

(10) Patent No.: US 11,677,898 B2
(45) Date of Patent: Jun. 13, 2023

(54) ELECTRONIC DEVICE FOR APPLYING EFFECT FOR MOVING OBJECT TO IMAGE AND METHOD FOR OPERATING THE SAME

(71) Applicant: Samsung Electronics Co., Ltd., Suwon-si (KR)

(72) Inventors: Inkoo Kang, Suwon-si (KR); Sungoh Kim, Suwon-si (KR); Jinhyun Kim, Suwon-si (KR); Jonghoon Won, Suwon-si (KR); Sangjun Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/674,236

(22) Filed: Feb. 17, 2022

(65) Prior Publication Data

US 2022/0385832 A1    Dec. 1, 2022

Related U.S. Application Data

(63) Continuation of application No. PCT/KR2022/001515, filed on Jan. 27, 2022.

(30) Foreign Application Priority Data

May 25, 2021    (KR) ........................ 10-2021-0066847

(51) Int. Cl.
*H04N 5/265*    (2006.01)
*G06T 7/12*    (2017.01)
(Continued)

(52) U.S. Cl.
CPC .............. *H04N 5/265* (2013.01); *G06T 7/12* (2017.01); *G06T 7/246* (2017.01); *H04N 5/2628* (2013.01);
(Continued)

(58) Field of Classification Search
CPC ...... H04N 5/265; H04N 5/2628; H04N 23/45; H04N 23/632; H04N 23/80; G06T 7/12;
(Continued)

(56) References Cited

U.S. PATENT DOCUMENTS

2011/0096202 A1    4/2011 Lee
2019/0096081 A1*   3/2019 Gupta ........................ G06T 5/00
(Continued)

FOREIGN PATENT DOCUMENTS

KR    10-2013-0040321 A    4/2013
KR    10-1635103 B1        6/2016
(Continued)

OTHER PUBLICATIONS

International Search Report dated Apr. 29, 2022, issued in International Patent Application No. 18182289.1.

*Primary Examiner* — Chiawei Chen
(74) *Attorney, Agent, or Firm* — Jefferson IP Law, LLP

(57) ABSTRACT

According to various embodiments, an electronic device is provided. The electronic device includes a display, a RGB sensor including a plurality of first pixels, a dynamic vision sensor including a plurality of second pixels, and a processor electrically connected with the display, the RGB sensor, and the dynamic vision sensor. The processor may be configured to detect a first signal to request to capture an image, obtain a first image including a first object using the RGB sensor, based on the detection of the first signal, identify at least one edge of the first object corresponding to at least one second image obtained during a first period specified by a time of detecting the first signal, among a plurality of second images obtained using the dynamic vision sensor, generate a synthesized image in which an effect related to the at least one edge of the first object is applied to the first image, and control the display to display the synthesized image.

20 Claims, 9 Drawing Sheets

(51) Int. Cl.
  *G06T 7/246*  (2017.01)
  *H04N 5/262*  (2006.01)
  *H04N 23/45*  (2023.01)
  *H04N 23/63*  (2023.01)

(52) U.S. Cl.
  CPC .......... *H04N 23/45* (2023.01); *H04N 23/632* (2023.01); *G06T 2207/10024* (2013.01); *G06T 2207/20212* (2013.01)

(58) Field of Classification Search
  CPC .......... G06T 7/246; G06T 2207/10024; G06T 2207/20212; G06T 2207/30224; G06T 2207/30241
  See application file for complete search history.

(56) References Cited

U.S. PATENT DOCUMENTS

2020/0322594 A1* 10/2020 Hicks .................. H04N 13/366
2021/0014435 A1   1/2021 Seo et al.
2021/0350145 A1* 11/2021 Park ....................... G06V 20/58
2021/0360136 A1* 11/2021 Yi ...................... H04N 23/6812

FOREIGN PATENT DOCUMENTS

| KR | 10-2020-004182 A |   | 4/2020 |
| KR | 20200044182 A | * | 4/2020 |
| KR | 10-2021-0006106 A |   | 1/2021 |
| KR | 10-2021-0036537 A |   | 4/2021 |

\* cited by examiner

< 601 >

< 602 >

< 701 >

< 702 >

ELECTRONIC DEVICE FOR APPLYING EFFECT FOR MOVING OBJECT TO IMAGE AND METHOD FOR OPERATING THE SAME

CROSS-REFERENCE TO RELATED APPLICATION(S)

This application is a continuation application, claiming priority under § 365(c), of an International application No. PCT/KR2022/001515, filed on Jan. 27, 2022, which is based on and claims the benefit of a Korean patent application number 10-2021-0066847, filed on May 25, 2021, in the Korean Intellectual Property Office, the disclosure of which is incorporated by reference herein in its entirety.

TECHNICAL FIELD

The disclosure relates to a method and a device for tracking the trajectory of a moving object (subject) and synthesizing an effect corresponding to the tracked trajectory into an image.

BACKGROUND ART

Image sensors may be divided into image sensors operating synchronously and image sensors operating asynchronously. A representative example of image sensors operating synchronously is a color sensor (e.g., a red green blue (RGB) sensor), and a representative example of image sensors operating asynchronously is a dynamic vision sensor (DVS).

Because the dynamic vision sensor may detect a change in light intensity due to the movement of an object, it does not output data if the object is still (i.e., when there is no change in light intensity for the pixel). In contrast, if the object moves, the dynamic vision sensor may output data representing the contour of the object because changes in light intensity occur primarily in the border or outline of the object.

The above information is presented as background information only to assist with an understanding of the disclosure. No determination has been made, and no assertion is made, as to whether any of the above might be applicable as prior art with regard to the disclosure.

DISCLOSURE

Technical Problem

A function (e.g., a drama shot function) for synthesizing images to represent the moving line of a moving object on one image using an RGB sensor may synthesize even the movement of an undesired object, as well as the object whose moving line is to be identified, if there are several moving objects or the background is shaken by the shooter's hand movement. Further, the RGB sensor is inappropriate for tracking the moving line of a moving object because there is a limit to the shooting speed due to its resolution and resource consumption is excessive.

Various embodiments of the disclosure are to address at least the above-mentioned problems and/or disadvantages and to provide at least the advantages described below. Accordingly, various embodiments of the disclosure is to provide an electronic device for displaying a synthesized image to which an object edge-related effect (e.g., the moving line of the object) is applied to the image, using both a RGB sensor and a dynamic sensor.

Additional embodiments s will be set forth in part in the description which follows and, in part, will be apparent from the description, or may be learned by practice of the presented embodiments.

Technical Solution

In accordance with various embodiments of the disclosure, an electronic device is provided. The electronic device includes a display, an RGB sensor including a plurality of first pixels, a dynamic vision sensor including a plurality of second pixels, and a processor electrically connected with the display, the RGB sensor, and the dynamic vision sensor. The processor may be configured to detect a first signal to request to capture an image, obtain a first image including a first object using the RGB sensor, based on the detection of the first signal, identify at least one edge of the first object corresponding to at least one second image obtained during a first period specified by a time of detecting the first signal, among a plurality of second images obtained using the dynamic vision sensor, generate a synthesized image in which an effect related to the at least one edge of the first object is applied to the first image, and control the display to display the synthesized image.

In accordance with various embodiments of the disclosure, a method for operating an electronic device is provided. The electronic device includes a display, an RGB sensor including a plurality of first pixels, and a dynamic vision sensor including a plurality of second pixels, and the method may comprise detecting a first signal to request to capture an image, obtaining a first image including a first object using the RGB sensor, based on the detection of the first signal, identifying at least one edge of the first object corresponding to at least one second image obtained during a first period specified by a time of detecting the first signal, among a plurality of second images obtained using the dynamic vision sensor, generating a synthesized image in which an effect related to the at least one edge of the first object is applied to the first image, and controlling the display to display the synthesized image.

Advantageous Effects

It is possible to represent the moving line of an object, more precisely tracked with low power, in one image by synthesizing an effect image related to the edge of the object identified using a dynamic vision sensor to an image captured using an RGB sensor.

Other embodiments, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other embodiments, features, and advantages of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
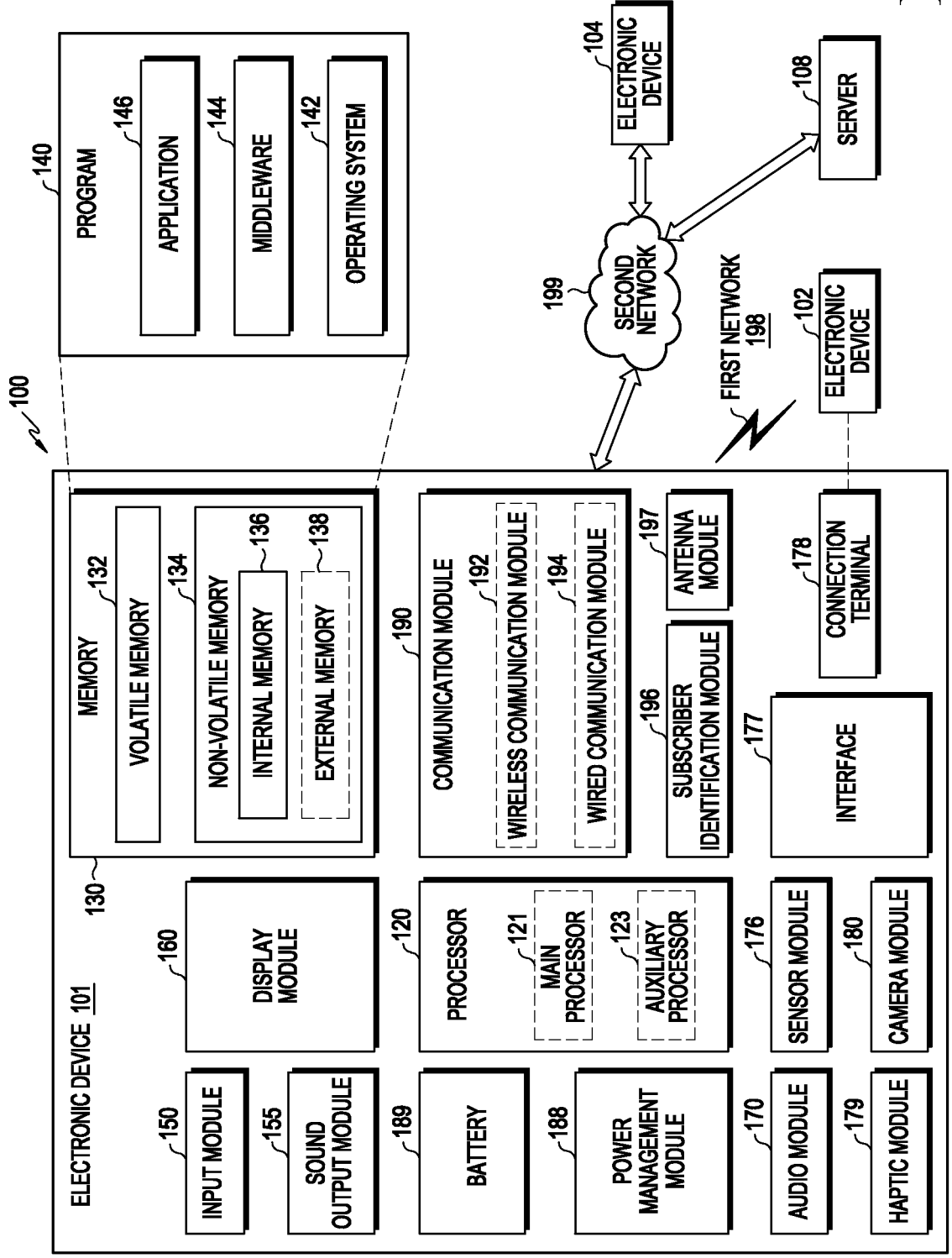
FIG. 1 is a block diagram illustrating an electronic device in a network environment according to various embodiments of the disclosure.

FIG. 1 is a block diagram illustrating an electronic device in a network environment according to an embodiment of the disclosure.

An electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module may include an antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
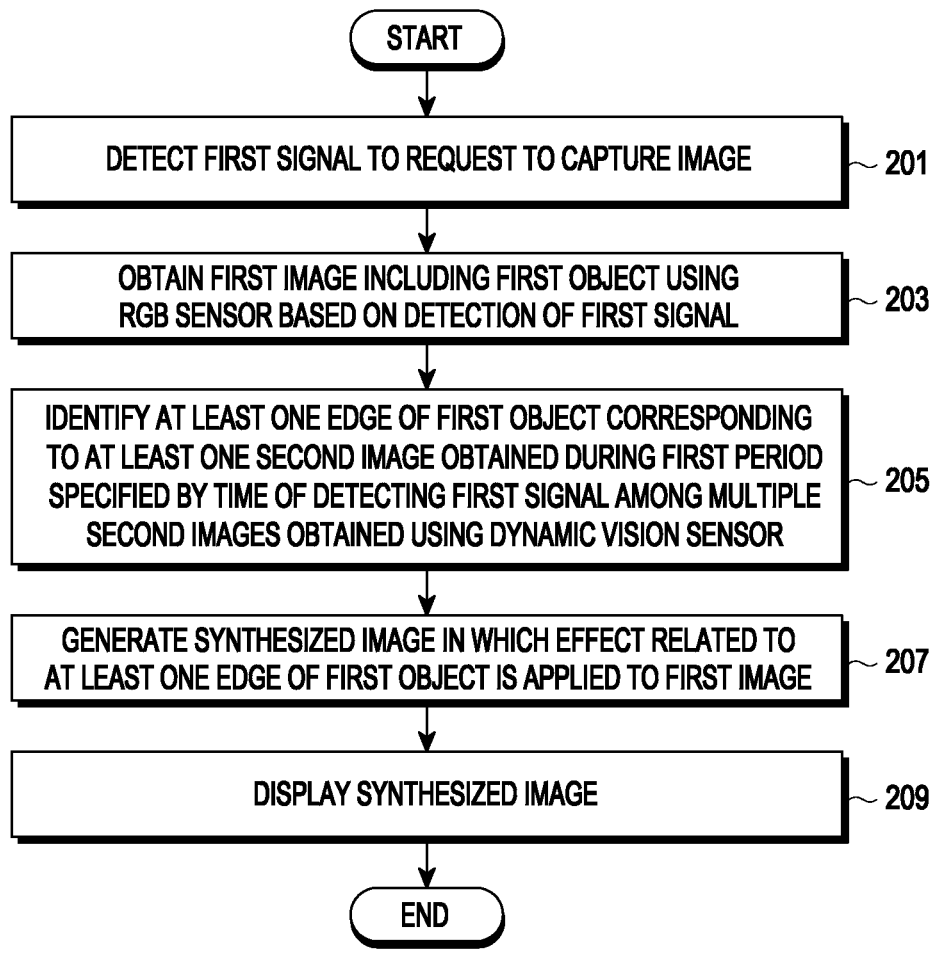
FIG. 2 is a flowchart illustrating an operation for displaying, by an electronic device, a synthesized image using an image obtained through RGB sensor and an image obtained through a dynamic vision sensor according to various embodiments of the disclosure.

FIG. 2 is a flowchart illustrating an operation for displaying, by an electronic device a synthesized image using an image obtained through an RGB sensor and an image obtained through a dynamic vision sensor according to various embodiments of the disclosure.

Figure 3:
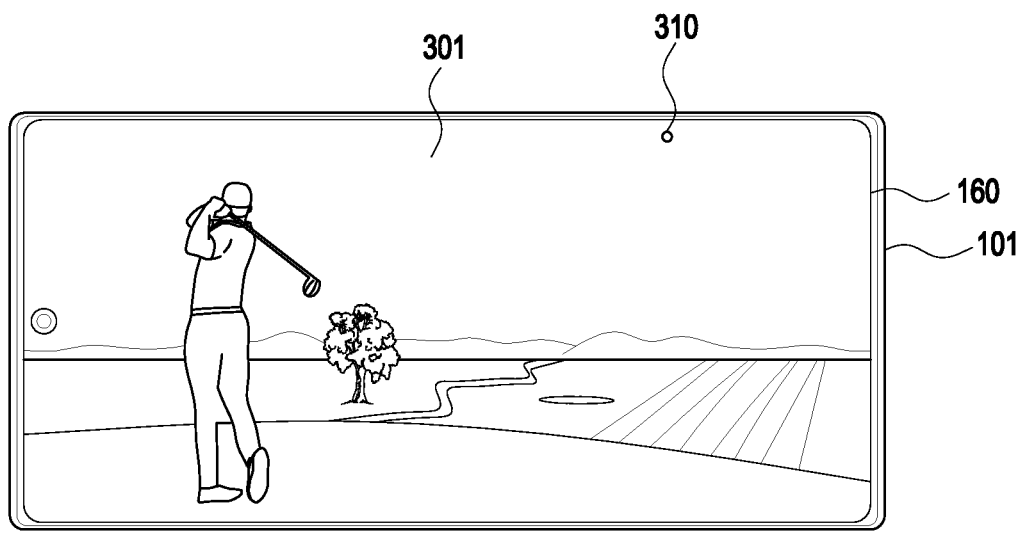
FIG. 3 is a view illustrating an operation for displaying a first image obtained through an RGB sensor by an electronic device according to various embodiments of the disclosure.

FIG. 3 is a view illustrating an operation for displaying a first image obtained through an RGB sensor by an electronic device according to various embodiments of the disclosure.

Figure 4A:
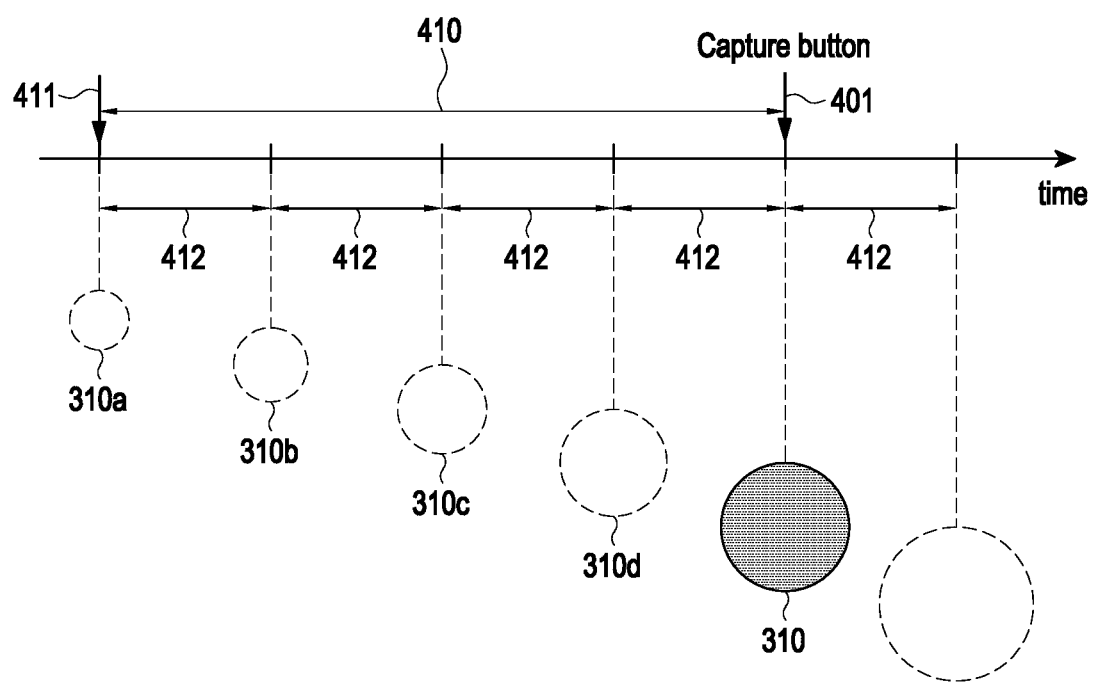
FIG. 4A is view illustrating an operation for identifying an edge of a first object from an image obtained through a dynamic vision sensor during a first period by an electronic device according to various embodiments of the disclosure.

FIG. 4A is view illustrating an operation for identifying an edge of a first object from an image obtained through a dynamic vision sensor during a first period by an electronic device according to various embodiments of the disclosure.

Figure 4B:
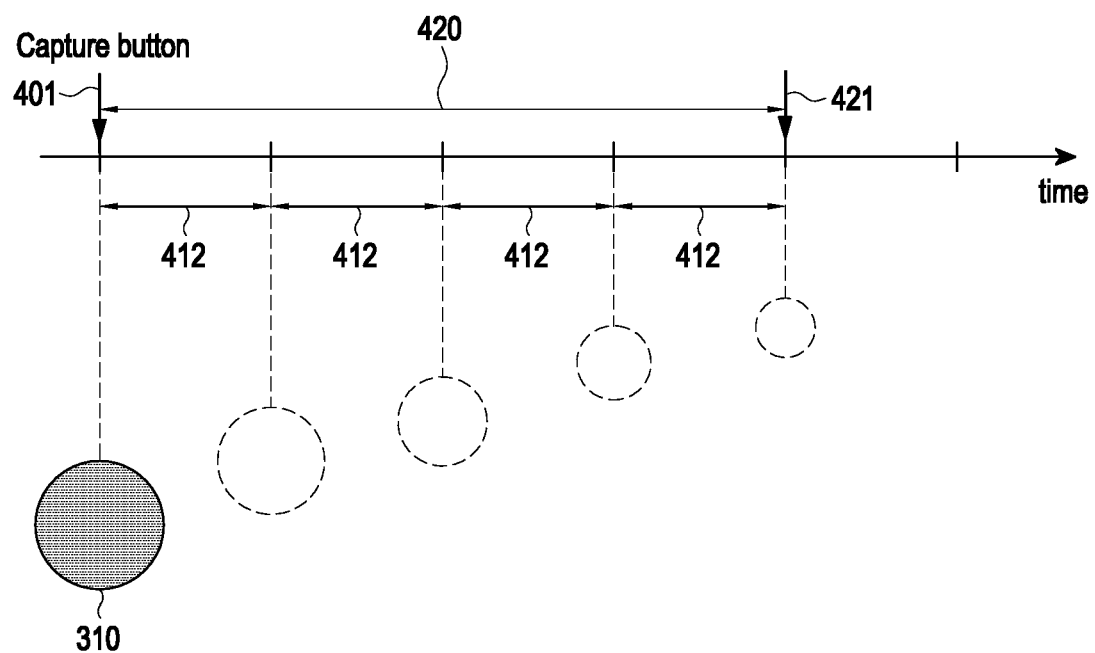
FIG. 4B is view illustrating an operation for identifying an edge of a first object from an image obtained through a dynamic vision sensor during a first period by an electronic device according to various embodiments of the disclosure.

FIG. 4B is view illustrating an operation for identifying an edge of a first object from an image obtained through a dynamic vision sensor during a first period by an electronic device according to various embodiments of the disclosure.

Figure 5:
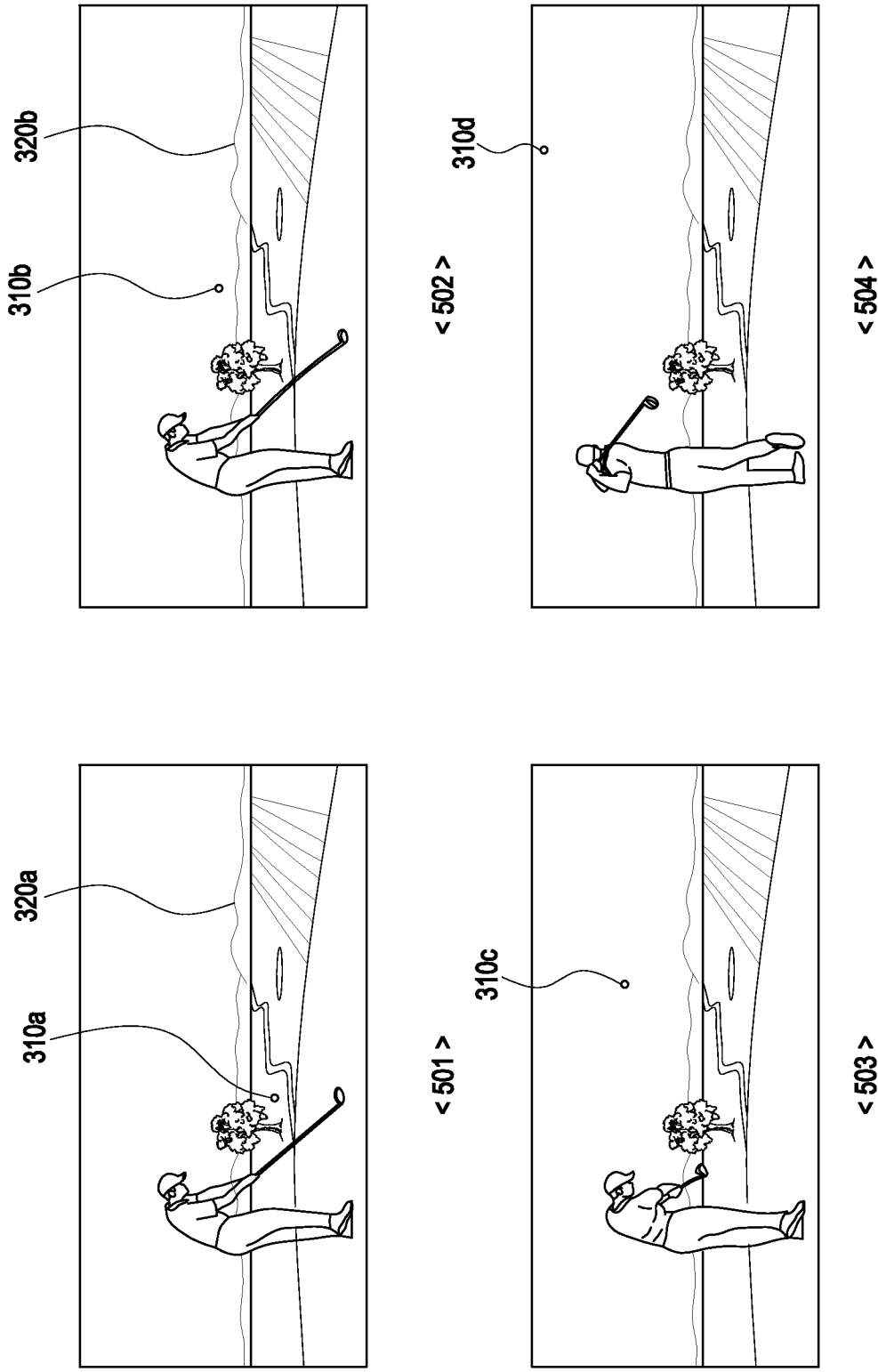
FIG. 5 is a view illustrating at least one second image obtained through a dynamic vision sensor during a first period by an electronic device according to various embodiments of the disclosure.

FIG. 5 is a view illustrating at least one second image obtained through a dynamic vision sensor during a first period by an electronic device according to various embodiments of the disclosure.

Figure 6:
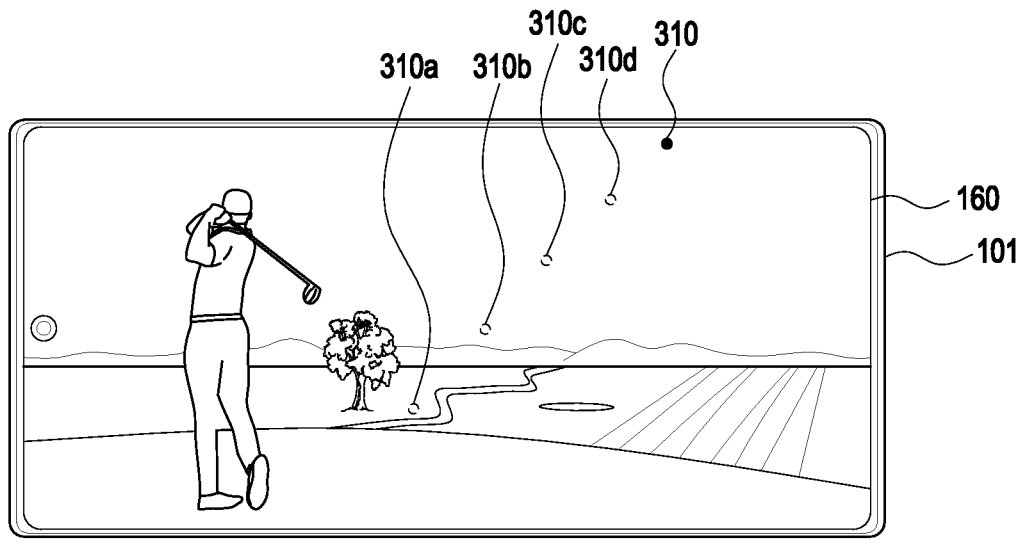
FIG. 6 is a view illustrating various embodiments for displaying a synthesized image by an electronic device according to various embodiments of the disclosure.
Figure 6:
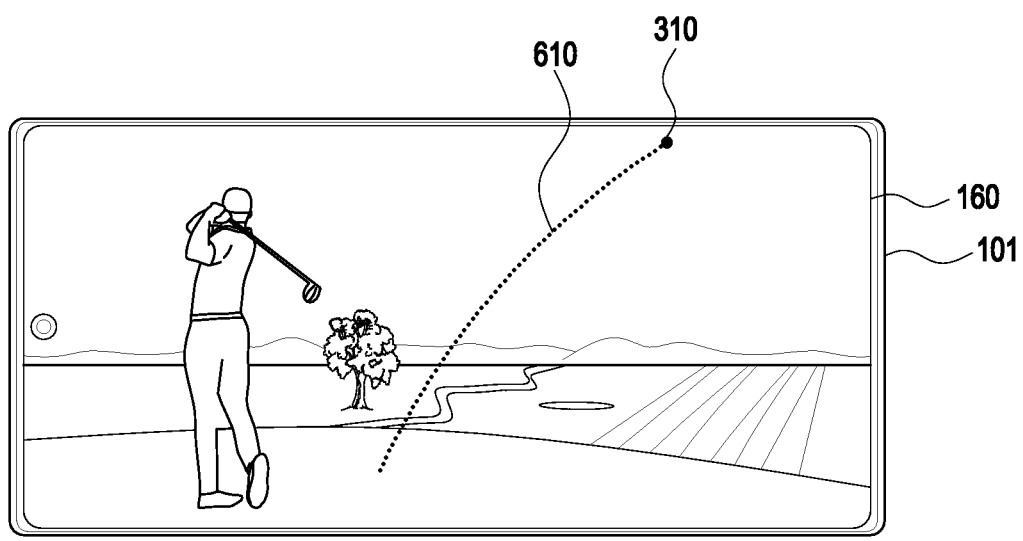

FIG. 6 is a view illustrating various embodiments for displaying a synthesized image by an electronic device according to various embodiments of the disclosure.

In operation 201, according to various embodiments of the disclosure, the electronic device (e.g., the processor 120 of FIG. 1) may detect a first signal to request to capture an image. According to various embodiments of the disclosure, the electronic device 101 may detect the first signal to request to capture an image in a state of performing a function for applying an effect related to the edge of an object to the inside of the image, based on the user's request.

In operation 203, according to various embodiments of the disclosure, the electronic device (e.g., the processor 120 of FIG. 1) may obtain a first image including a first object using an RGB sensor including a plurality of first pixels based on detection of the first signal. According to various embodiments of the disclosure, the RGB sensor may be implemented in the camera 180. The RGB sensor may output first data regarding the color information (e.g., red/green/blue) about the area corresponding to each of the plurality of first pixels to the processor 120 (e.g., an application processor and/or image signal processor), and the processor 120 may generate a first image including the information regarding the color of each area using the first data. According to various embodiments of the disclosure, the electronic device 101 may obtain the first image corresponding to the time of detecting the first signal. For example, the electronic device 101 may obtain a first image 301 including the first object 310 (e.g., a golf ball) using the RGB sensor which outputs the data regarding the color information about each area, based on detection of the first signal. According to various embodiments of the disclosure, the electronic device 101 may store the obtained first image in a memory (e.g., the memory 130 of FIG. 1).

In operation 205, according to various embodiments of the disclosure, the electronic device (e.g., the processor 120 of FIG. 1) may identify at least one edge of the first object corresponding to at least one second image obtained during a first period specified by the time of detecting the first signal among a plurality of second images obtained using a dynamic vision sensor (DVS) including a plurality of second pixels. According to various embodiments of the disclosure, the dynamic vision sensor may be implemented along with the RGB sensor in the camera 180, and the dynamic vision sensor may detect the event that the light intensity changes in the area corresponding to each of the plurality of second pixels. For example, because the dynamic vision sensor is able to detect the event that light intensity changes in the edge of the moving object, the dynamic vision sensor may detect the edge of the object according to a movement of at least one of the object or the electronic device 101. According to various embodiments of the disclosure, the dynamic vision sensor may output second data regarding the event that light intensity changes to the processor 120 (e.g., an application processor and/or image signal processor), and the processor 120 may generate a plurality of second images including information regarding the change in light intensity in each area using the second data. According to various embodiments of the disclosure, the electronic device 101 may store the plurality of generated second images in the memory 130.

According to various embodiments of the disclosure, the electronic device (e.g., the processor 120 of FIG. 1) may identify at least one second image obtained during a first period specified by the time of detecting the first signal to request to capture an image among the plurality of second images obtained using the dynamic vision sensor.

According to various embodiments of the disclosure, the first period specified by the time of detecting the first signal may include a first sub period from the time of detecting the first signal to a first previous time. For example, the electronic device 101 may identify at least one second image obtained using the dynamic vision sensor during a first sub period 410 from a time 401 of detecting the first signal (e.g., the time for the user to press the image capture button) to a first previous time 411. In this case, the electronic device 101 may obtain each of the at least one second image according to a DVS sampling interval 412. More specifically, the electronic device 101 may identify at least one second image 501, 502, 503, and 504 obtained using the dynamic vision sensor during the first sub period 410.

According to various embodiments of the disclosure, the first period specified by the time of detecting the first signal may include a second sub period from the time of detecting the first signal to a first subsequent time. For example, the electronic device 101 may identify at least one second image obtained using the dynamic vision sensor during a second sub period 420 from the time 401 of detecting the first signal to the first subsequent time 421. According to various embodiments of the disclosure, the first period may include both the first sub period 410 and the second sub period 420.

According to various embodiments of the disclosure, the electronic device (e.g., the processor 120 of FIG. 1) may identify at least one edge of the first object from at least one second image obtained during the first period specified by the time of detecting the first signal. For example, the electronic device 101 may detect edges 310a, 310b, 310c, and 310d of the first object 310 from each of at least one second image 501, 502, 503, and 504 obtained during the first sub period 410 from the time 401 of capturing the first object 310 (e.g., a golf ball) to the first previous time 411. In this case, in a state in which the electronic device 101 is not stationary but shaken (e.g., when the user holds the electronic device 101 in her hand), objects (e.g., mountains or trees) which do not actually move may be included in the at least one second image 501, 502, 503, and 504 as the light intensity changes due to the movement of the electronic device 101.

According to various embodiments of the disclosure, the electronic device 101 may identify the edge of the first object in a predetermined area (e.g., the area to which an object edge-related effect is to be applied) of at least one second image. For example, the electronic device 101 may detect the edges 310a, 310b, 310c, and 310d of the first object 310 in the predetermined area (not shown) of each of at least one second image 501, 502, 503, and 504. Various embodiments of setting a predetermined area 510 is described in detail with reference to FIG. 7.

According to various embodiments of the disclosure, the electronic device 101 (e.g., the processor 120 of FIG. 1) may adjust the size of at least one second image into a predetermined size and identify the edge of the object from the at least one second image adjusted into the predetermined size. For example, the electronic device 101 may resize at least one second image 501, 502, 503, and 504 from a first size (e.g., a resolution of 640×480) to a second size (e.g., a resolution of 1920×1080) and detect the edges 310a, 310b, 310c, and 310d of the first object 310 from each of the at least one resized second image 501, 502, 503, and 504. According to various embodiments of the disclosure, the electronic device 101 may adjust the size of at least one second image based on the distance between the edges of the object. For example, the electronic device 101 may calculate the average of the distances between the edges 310a, 310b, 310c, and 310d of the first object 310 in at least one second image 501, 502, 503, and 504 and resize the at least one second image 501, 502, 503, and 504 into a specific size corresponding to the average distance. According to various embodiments of the disclosure, the electronic device 101 may calculate a specific distance between the first object 310 and the camera 180 using auto focusing technology or depth sensor and adjust the size of at least one second image into the specific size corresponding to the distance. The specific size of at least one second image may be adjusted to differ for the average distance or the specific distance.

In operation 207, according to various embodiments of the disclosure, the electronic device (e.g., the processor 120 of FIG. 1) may generate a synthesized image in which an effect related to at least one edge of the first object corresponding to at least one second image is applied to the first image obtained through the RGB sensor.

According to various embodiments of the disclosure, the electronic device 101 (e.g., the processor 120 of FIG. 1) may adjust the size of the first image obtained through the RGB sensor into a predetermined size and generate a synthesized image in which an effect related to at least one edge of the first object is applied to the first image resized into the predetermined size. For example, referring to <601> of FIG. 6, the electronic device 101 may resize the first image 301 from a third size (e.g., a resolution of 3840×2160) to a second size (e.g., a resolution of 1920×1080) and generate a synthesized image 601 by applying the edges 310a, 310b, 310c, and 310d of the first object 310, detected from each of at least one second image 501, 502, 503, and 504 resized from the first size (e.g., a resolution of 640×480) to the second size (e.g., a resolution of 1920×1080), to the resized first image 301. As another example, referring to <602> of FIG. 6, the electronic device 101 may generate a synthesized image by applying a trajectory 610 of the first object 310, which connects the edges 310a, 310b, 310c, and 310d of the first object 310 detected from each of at least one resized second image 501, 502, 503, and 504, to the resized first image 301. Because the dynamic vision sensor is physically smaller in size than the RGB sensor, a process is needed for matching synthesis conditions (e.g., image size, object synthesis position, and image output time) between the dynamic vision sensor and the RGB sensor. According to various embodiments of the disclosure, to find the optimal synthesis condition for the output images from the dynamic vision sensor and RGB sensor, the electronic device 101 may train each element of the synthesis condition using a deep neural network (DNN), a convolutional neural network (CNN), a recurrent neural network (RNN), a restricted Boltzmann machine (RBM), a deep belief network (DBN), a bidirectional recurrent deep neural network (BRDNN), or a deep Q-networks, or one of combinations of two or more thereof, but is not limited to the above-described examples. According to various embodiments of the disclosure, edge-related effects may include bokeh effects or optical flow effects using the edge of the object, as well as the effect of enlisting the above-described edges 310a to 310d or the effect of displaying the trajectory of the edge, but are not limited thereto. According to various embodiments of the disclosure, the electronic device 101 may generate a synthesized image in which the color information about the first object included in the first image obtained through the RGB sensor is applied to the inside of the edge of the first object included in the second image obtained through the dynamic vision sensor. For example, the electronic device 101 may generate a synthesized image in which the color information about each object (e.g., a human, mountain, or ball) included in the first image 310 is applied to the inside of each object included in the second image 504.

In operation 209, according to various embodiments of the disclosure, the electronic device (e.g., the processor 120) may display the synthesized image through the display module 160. For example, the electronic device 101 may display, through the display module 160, the synthesized image 601 in which the edges 310a, 310b, 310c, and 310d of the first object 310 are applied to the first image 301. As another example, the electronic device 101 may display, through the display module 160, the synthesized image 602 in which the trajectory 610 of the first object 310 which connects the edges 310a, 310b, 310c, and 310d of the first object 310 is applied to the first image 301.

Figure 7:
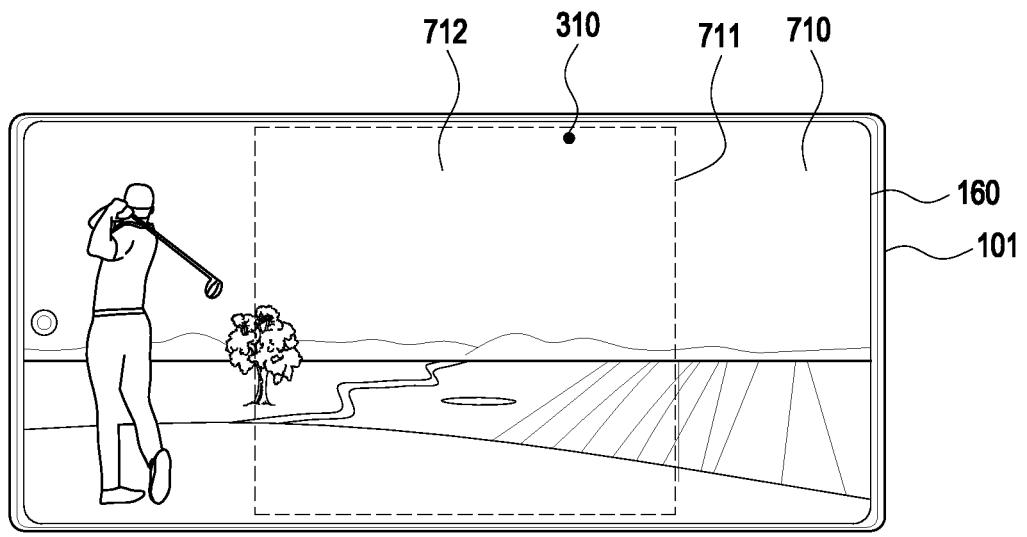
FIG. 7 is a view illustrating an operation for identifying an area to which an effect related to an edge of an object is to be applied, by an electronic device according to various embodiments of the disclosure.
Figure 7:
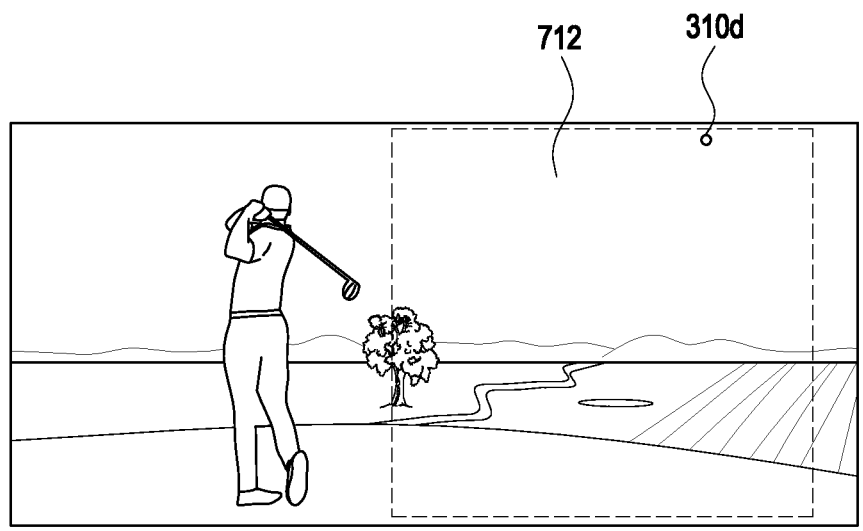

FIG. 7 is a view illustrating an operation for identifying an area to which an effect related to an edge of an object is to be applied, by an electronic device (e.g., the electronic device 101 of FIG. 1), according to various embodiments of the disclosure.

According to various embodiments of the disclosure, the electronic device 101 (e.g., the processor 120 of FIG. 1) may display a preview image on the display (e.g., the display module 160 of FIG. 1) using images obtained through the camera (e.g., the camera module 180 of FIG. 1) before detecting a first signal to request to capture an image and identify an area to which an object edge-related effect is to be applied from the preview image. According to various embodiments of the disclosure, the electronic device 101 may identify a first area to which the object edge-related effect is to be applied from the preview image based on a user input to the preview image. For example, referring to <701> of FIG. 7, the electronic device 101 may display an indicator 711 in a preview image 710, change at least one of the size or position of the indicator 711 according to a user input, and identify a first area 712 specified by the indicator 711. According to various embodiments of the disclosure, as the RGB sensor and the dynamic vision sensor are physically spaced apart by a predetermined distance and disposed in the electronic device 101, the fields of view of the sensors may not be identical. Thus, the electronic device 101 may set the second area of the second image obtained through the dynamic vision sensor, corresponding to the first area 712 of the first image obtained through the RGB sensor, as the area to which the object edge-related effect is to be applied. For example, referring to <702> of FIG. 7, the electronic device 101 may set the second area 713, which overlaps the first area 712 specified by the indicator 711 in the preview image 710, of the entire area of the second image output through the dynamic vision sensor, as the area to which the object edge-related effect is to be applied. According to various embodiments of the disclosure, the electronic device 101 may set the area corresponding to the entire area of the preview image, of the entire area of the image output through the dynamic vision sensor, as the area to which the object edge-related effect is to be applied.

According to various embodiments of the disclosure, the electronic device 101 (e.g., the processor 120 of FIG. 1) may set an area to which the object edge-related effect is to be applied according to a user input in the first image after capturing the first image through the RGB sensor of the camera 180 according to the first signal to request to capture an image.

According to various embodiments of the disclosure, the electronic device 101 (e.g., the processor 120 of FIG. 1) may identify at least one edge of the first object using the area to which the object edge-related effect is to be applied. For example, referring to <701> and <702> of FIG. 7, in a case where the first area 712 is set through the indicator 711 in the preview image 710, the electronic device 101 may detect an edge 310d of the first object 310 (e.g., a golf ball) that moves in the second area 713 corresponding to the first area 712.

Figure 8:
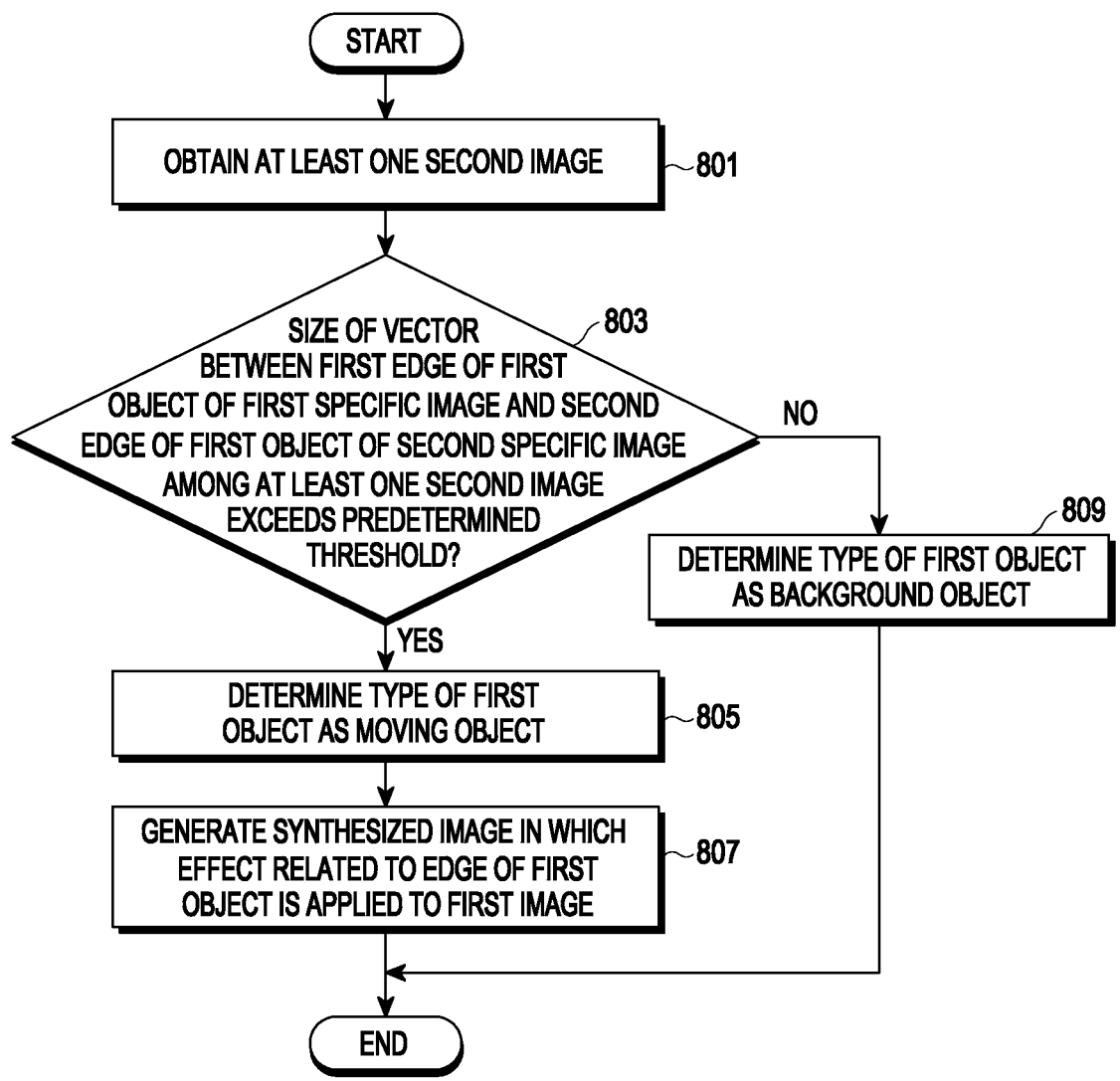
FIG. 8 is a flowchart illustrating an operation for determining a type of a first object by an electronic device according to various embodiments of the disclosure.

FIG. 8 is a flowchart illustrating an operation for determining a type of a first object by an electronic device (e.g., the electronic device 101 of FIG. 1), according to various embodiments of the disclosure.

In operation 801, according to various embodiments of the disclosure, the electronic device (e.g., the processor 120 of FIG. 1) may obtain at least one second image using a dynamic vision sensor including a plurality of second pixels. According to various embodiments of the disclosure, the electronic device 101 may identify at least one edge of the first object from at least one second image obtained during the first period specified by the time of detecting the first signal to request to capture an image.

In operation 803, according to various embodiments of the disclosure, the electronic device (e.g., the processor 120 of FIG. 1) may determine whether the size of the vector between a first edge of a first object of a first specific image and a second edge of a first object of a second specific image among at least one second image exceeds a predetermined threshold. According to various embodiments of the disclosure, the electronic device 101 may identify the type (e.g., moving object or background object) of the object based on a variation in vector of the edge between at least one second image obtained using the dynamic vision sensor.

In operation 805, according to various embodiments of the disclosure, if the size of the vector between the first edge of the first object of the first specific image and the second edge of the first object of the second specific image among at least one second image exceeds the predetermined threshold, the electronic device (e.g., the processor 120 of FIG. 1) may determine the type of the first object as a moving object. For example, when the size of the vector between a first edge 310a of a first object 310 (e.g., a golf ball) detected from a first specific image 501 and a second edge 310b of the first object 310 detected from a second specific image 502 exceeds a predetermined threshold, the electronic device 101 may determine the first object 310 as a moving object.

In operation 807, according to various embodiments of the disclosure, the electronic device (e.g., the processor 120 of FIG. 1) may generate a synthesized image in which an effect related to the edge of the first object is applied to the first image obtained through the RGB sensor.

According to various embodiments of the disclosure, when the type of the first object is a moving object, the electronic device 101 may generate a synthesized image in which the effect related to at least one edge of the first object identified from at least one second image obtained during the first period specified by the time of detecting the first signal is applied to the first image. For example, when the type of the first object 310 is a moving object, the electronic device 101 may detect edges 310a, 310b, 310c, and 310d of the first object 310 from each of at least one second image (e.g., at least one second image 501, 502, 503, and 504 of FIG. 5) obtained during the first period (e.g., the first sub period 410 of FIG. 4A) and generate a synthesized image 601 in which the edges 310a, 310b, 310c, and 310d of the first object 310 are applied to the first image (e.g., the first image 301 of FIG. 3).

In operation 809, according to various embodiments of the disclosure, if the size of the vector between the first edge of the first object of the first specific image and the second edge of the first object of the second specific image among at least one second image is the predetermined threshold or less, the electronic device (e.g., the processor 120 of FIG. 1) may determine the first object as a background object (i.e., an object whose edge is detected by the movement of the electronic device 101). For example, when the size of the vector between a first edge 320a of a first object (e.g., a mountain) detected from a first specific image 501 and a second edge 320b of the first object detected from a second specific image 502 is the predetermined threshold or less, the electronic device 101 may determine the first object as a background object. According to various embodiments of the disclosure, when the type of the first object is a background object, the electronic device 101 may not apply an effect related to at least one edge of the first object to the first image.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device (e.g., the electronic device 101 of FIG. 1) may comprise a display (e.g., the display module 160 of FIG. 1), an RGB sensor including a plurality of first pixels, a dynamic vision sensor including a plurality of second pixels, and a processor electrically connected with the display, the RGB sensor, and the dynamic vision sensor. The processor may be configured to detect a first signal to request to capture an image, obtain a first image including a first object using the RGB sensor, based on the detection of the first signal, identify at least one edge of the first object corresponding to at least one second image obtained during a first period specified by a time of detecting the first signal, among a plurality of second images obtained using the dynamic vision sensor, generate a synthesized image in which an effect related to the at least one edge of the first object is applied to the first image, and control the display to display the synthesized image.

According to various embodiments of the disclosure, the first period may include at least one of a first sub period (e.g., the first sub period 410 of FIG. 4A) from the time of detecting the first signal to a first previous time or a second sub period (e.g., the second sub period 420 of FIG. 4B) from the time of detecting the first signal to a first subsequent time.

According to various embodiments of the disclosure, the processor may be configured to adjust a size of the at least one second image from a first size to a second size, and identify the at least one edge of the first object from the at least one second image adjusted to the second size.

According to various embodiments of the disclosure, the processor may be configured to adjust a size of the first image from a third size to the second size, and generate a synthesized image in which the effect related to the at least one edge of the first object is applied to the first image adjusted to the second size.

According to various embodiments of the disclosure, the processor may be configured to control the display to display a preview image (e.g., the preview image 710 of FIG. 7) obtained through a camera (e.g., the camera module 180 of FIG. 1) of the electronic device before detecting the first signal, and identify an area to which an effect related to an edge of the object is to be applied from the preview image.

According to various embodiments of the disclosure, the processor may be configured to control the display to display an indicator (e.g., the indicator 711 of FIG. 7) in the preview image, and identify a second area (e.g., the second area 713 of FIG. 7) corresponding to a first area (e.g., the first area 712 of FIG. 7) specified by the indicator among the at least one second image as the area to which the effect related to the edge of the object is to be applied.

According to various embodiments of the disclosure, the processor may be configured to change at least one of a size or position of the indicator according to a user input.

According to various embodiments of the disclosure, the processor may be configured to determine whether a size of a vector between a first edge of the first object of a first specific image and a second edge of the first object of a second specific image among the at least one second image exceeds a predetermined threshold.

According to various embodiments of the disclosure, the processor may be configured to, when the size of the vector between the first edge and the second edge exceeds the predetermined threshold, determine that a type of the first object is a moving object and, when the type of the first object is the moving object, apply the effect related to the at least one edge of the first object to the first image.

According to various embodiments of the disclosure, the processor may be configured to, when the size of the vector between the first edge and the second edge is the predetermined threshold or less, determine that the type of the first object is a background object and, when the type of the first object is the background object, omit applying the effect related to the at least one edge of the first object to the first image.

According to various embodiments of the disclosure, a method for operating an electronic device including a display, an RGB sensor including a plurality of first pixels, and a dynamic vision sensor including a plurality of second pixels may comprise detecting a first signal to request to capture an image, obtaining a first image including a first object using the RGB sensor, based on the detection of the first signal, identifying at least one edge of the first object corresponding to at least one second image obtained during a first period specified by a time of detecting the first signal, among a plurality of second images obtained using the dynamic vision sensor, generating a synthesized image in which an effect related to the at least one edge of the first object is applied to the first image, and controlling the display to display the synthesized image.

According to various embodiments of the disclosure, identifying the at least one edge of the first object may include adjusting a size of the at least one second image from a first size to a second size, and identifying the at least one edge of the first object from the at least one second image adjusted to the second size.

According to various embodiments of the disclosure, generating the synthesized image may include adjusting a size of the first image from a third size to the second size, and generating a synthesized image in which the effect related to the at least one edge of the first object is applied to the first image adjusted to the second size.

According to various embodiments of the disclosure, the method may further comprise controlling the display to display a preview image obtained through a camera of the electronic device before detecting the first signal, and identifying an area to which an effect related to an edge of the object is to be applied from the preview image.

According to various embodiments of the disclosure, identifying the area to which the effect related to the edge of the object is to be applied may include controlling the display to display an indicator in the preview image, and identifying a second area corresponding to a first area specified by the indicator among the at least one second image as the area to which the effect related to the edge of the object is to be applied.

According to various embodiments of the disclosure, the method may further comprise changing at least one of a size or position of the indicator according to a user input.

According to various embodiments of the disclosure, the method may further comprise determining whether a size of a vector between a first edge of the first object of a first specific image and a second edge of the first object of a second specific image among the at least one second image exceeds a predetermined threshold.

According to various embodiments of the disclosure, generating the synthesized image may include, when the size of the vector between the first edge and the second edge exceeds the predetermined threshold, determining that a type of the first object is a moving object and, when the type of the first object is the moving object, applying the effect related to the at least one edge of the first object to the first image.

According to various embodiments of the disclosure, the method may further comprise, when the size of the vector between the first edge and the second edge is the predetermined threshold or less, determining that the type of the first object is a background object and, when the type of the first object is the background object, omitting applying the effect related to the at least one edge of the first object to the first image.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a RGB sensor including a plurality of first pixels;
a dynamic vision sensor including a plurality of second pixels; and
a processor electrically connected with the display, the RGB sensor, and the dynamic vision sensor,
wherein the processor is configured to:
  detect a first signal to request to capture an image,
  obtain a first image including a first object using the RGB sensor, based on the detection of the first signal,
  identify at least one edge of the first object corresponding to at least one second image obtained during a first period specified by a time of detecting the first signal, among a plurality of second images obtained using the dynamic vision sensor,
  generate a synthesized image in which an effect related to the at least one edge of the first object is applied to the first image, and
  control the display to display the synthesized image.

2. The electronic device of claim 1, wherein the first period includes at least one of a first sub period from the time of detecting the first signal to a first previous time or a second sub period from the time of detecting the first signal to a first subsequent time.

3. The electronic device of claim 1, wherein the processor is further configured to:
adjust a size of the at least one second image from a first size to a second size, and
identify the at least one edge of the first object from the at least one second image adjusted to the second size.

4. The electronic device of claim 3, wherein the processor is further configured to:
adjust a size of the first image from a third size to the second size, and
generate a synthesized image in which the effect related to the at least one edge of the first object is applied to the first image adjusted to the second size.

5. The electronic device of claim 1, wherein the processor is further configured to:
control the display to display a preview image obtained through a camera of the electronic device before detecting the first signal, and
identify an area to which the effect related to the at least one edge of the first object is to be applied from the preview image.

6. The electronic device of claim 5, wherein the processor is further configured to:
control the display to display an indicator in the preview image, and
identify a second area corresponding to a first area specified by the indicator among the at least one second image as the area to which the effect related to the at least one edge of the first object is to be applied.

7. The electronic device of claim 6, wherein the processor is further configured to change at least one of a size or position of the indicator according to a user input.

8. The electronic device of claim 1, wherein the processor is further configured to determine whether a size of a vector between a first edge of the first object of a first specific image and a second edge of the first object of a second specific image among the at least one second image exceeds a predetermined threshold.

9. The electronic device of claim 8, wherein the processor is further configured to:
when the size of the vector between the first edge and the second edge exceeds the predetermined threshold, determine a type of the first object as a moving object, and
when the type of the first object is the moving object, apply the effect related to the at least one edge of the first object to the first image.

10. The electronic device of claim 8, wherein the processor is further configured to:
when the size of the vector between the first edge and the second edge is the predetermined threshold or less, determine a type of the first object as a background object, and when the type of the first object is the background object, omit applying the effect related to the at least one edge of the first object to the first image.

11. A method for operating an electronic device including a display, a RGB sensor including a plurality of first pixels, and a dynamic vision sensor including a plurality of second pixels, the method comprising:
  detecting a first signal to request to capture an image;
  obtaining a first image including a first object using the RGB sensor, based on the detection of the first signal;
  identifying at least one edge of the first object corresponding to at least one second image obtained during a first period specified by a time of detecting the first signal, among a plurality of second images obtained using the dynamic vision sensor;
  generating a synthesized image in which an effect related to the at least one edge of the first object is applied to the first image; and
  controlling the display to display the synthesized image.

12. The method of claim 11, wherein the first period includes at least one of a first sub period from the time of detecting the first signal to a first previous time or a second sub period from the time of detecting the first signal to a first subsequent time.

13. The method of claim 11, wherein the identifying of the at least one edge of the first object includes:
  adjusting a size of the at least one second image from a first size to a second size; and
  identifying the at least one edge of the first object from the at least one second image adjusted to the second size.

14. The method of claim 13, wherein the generating of the synthesized image includes:
  adjusting a size of the first image from a third size to the second size; and
  generating a synthesized image in which the effect related to the at least one edge of the first object is applied to the first image adjusted to the second size.

15. The method of claim 11, further comprising:
  controlling the display to display a preview image obtained through a camera of the electronic device before detecting the first signal; and
  identifying an area to which an effect related to the at least one edge of the first object is to be applied from the preview image.

16. The method of claim 15, wherein the identifying of the area to which the effect related to the at least one edge of the first object is to be applied includes:
  controlling the display to display an indicator in the preview image; and
  identifying a second area corresponding to a first area specified by the indicator among the at least one second image as the area to which the effect related to the edge of the first object is to be applied.

17. The method of claim 16, further comprising changing at least one of a size or position of the indicator according to a user input.

18. The method of claim 11, further comprising determining whether a size of a vector between a first edge of the first object of a first specific image and a second edge of the first object of a second specific image among the at least one second image exceeds a predetermined threshold.

19. The method of claim 18, wherein the generating of the synthesized image includes:
  when the size of the vector between the first edge and the second edge exceeds the predetermined threshold, determining a type of the first object as a moving object; and
  when the type of the first object is the moving object, applying the effect related to the at least one edge of the first object to the first image.

20. At least one non-transitory storage medium storing instructions which are configured to, when executed by at least one processor, cause the at least one processor to perform at least one operation,
  wherein the at least one operation includes:
    detecting a first signal to request to capture an image;
    obtaining a first image including a first object using a RGB sensor, based on the detection of the first signal;
    identifying at least one edge of the first object corresponding to at least one second image obtained during a first period specified by a time of detecting the first signal, among a plurality of second images obtained using a dynamic vision sensor;
    generating a synthesized image in which an effect related to the at least one edge of the first object is applied to the first image; and
    controlling a display to display the synthesized image.

* * * * *